United States Patent
Giannakakis et al.

(10) Patent No.: US 12,221,223 B2
(45) Date of Patent: Feb. 11, 2025

(54) SYSTEM FOR DETERMINING THE ANGULAR SETTING OF AN ANNULAR ROW OF STATOR VANES

(71) Applicant: SAFRAN, Paris (FR)

(72) Inventors: Panagiotis Giannakakis, Moissy-Cramayel (FR); William Henri Joseph Riera, Moissy-Cramayel (FR)

(73) Assignee: SAFRAN, Paris (FR)

( * ) Notice: Subject to any disclaimer, the term of this patent is extended or adjusted under 35 U.S.C. 154(b) by 205 days.

(21) Appl. No.: 17/995,520

(22) PCT Filed: Apr. 9, 2021

(86) PCT No.: PCT/FR2021/050636
§ 371 (c)(1),
(2) Date: Oct. 5, 2022

(87) PCT Pub. No.: WO2021/205133
PCT Pub. Date: Oct. 14, 2021

(65) Prior Publication Data
US 2023/0150688 A1    May 18, 2023

(30) Foreign Application Priority Data
Apr. 10, 2020   (FR) ...................................... 2003639

(51) Int. Cl.
*B64D 5/00*         (2006.01)
*B64C 11/00*       (2006.01)
(Continued)

(52) U.S. Cl.
CPC ................ *B64D 45/00* (2013.01); *B64F 5/60* (2017.01)

(58) Field of Classification Search
CPC . B64D 45/00; B64F 5/60; B64C 11/30; B64C 11/00
(Continued)

(56) References Cited

U.S. PATENT DOCUMENTS

| | | | |
|---|---|---|---|
| 5,421,538 A * | 6/1995 | Vassa (Suratano Thienphropa) | ......... B64C 27/20 244/23 B |
| 2015/0363981 A1* | 12/2015 | Ziarno | .................... H04L 67/12 701/1 |

(Continued)

FOREIGN PATENT DOCUMENTS

| EP | 3 159 523 A1 | 4/2017 |
|---|---|---|
| FR | 082 230 A1 | 12/2019 |

(Continued)

OTHER PUBLICATIONS

English translation of Written Opinion mailed Jul. 28, 2021, issued in corresponding International Application No. PCT/FR2021/050636, filed Apr. 9, 2021, 6 pages.

(Continued)

*Primary Examiner* — Tyler D Paige
(74) *Attorney, Agent, or Firm* — CHRISTENSEN O'CONNOR JOHNSON KINDNESS PLLC

(57) ABSTRACT

A method determines the angular setting ($\beta\_2$) of an annular row of stator vanes arranged downstream of a pusher propeller of a propulsion system with a longitudinal axis. The annular row of stator vanes receives an air flow having a velocity (V2) including a longitudinal component (Viz) and a tangential component ($V\_i\theta$) associated with the velocity of gyration generated by the pusher propeller. The method includes the steps of establishing a theoretical model of the pusher propeller using a power (P1) and a mechanical speed (N1) associated with said pusher propeller, and flight conditions that include a velocity of the airflow incident on (Continued)

the pusher propeller, the altitude of said propulsion system and ambient temperature. The method further includes the step of determining an angular setting ($\beta\_1$) of the pusher propeller from the theoretical model.

5 Claims, 2 Drawing Sheets

(51) Int. Cl.
  *B64D 45/00* (2006.01)
  *B64F 5/60* (2017.01)
(58) Field of Classification Search
  USPC .................................................... 701/32.8
  See application file for complete search history.

(56) References Cited

U.S. PATENT DOCUMENTS

| | | | |
|---|---|---|---|
| 2016/0010487 A1* | 1/2016 | Breeze-Stringfellow | ............. F02K 1/46 415/208.1 |
| 2017/0240286 A1* | 8/2017 | Lemarchand | ............. B64C 3/32 |
| 2019/0136710 A1* | 5/2019 | Breeze-Stringfellow | ............. B64C 11/48 |
| 2023/0150688 A1* | 5/2023 | Giannakakis | .......... B64D 45/00 701/32.8 |

FOREIGN PATENT DOCUMENTS

| | | |
|---|---|---|
| GB | 2 081 393 A | 2/1982 |
| GB | 2 461 811 A | 1/2010 |

OTHER PUBLICATIONS

International Preliminary Report on Patentability mailed Oct. 6, 2022, issued in corresponding International Application No. PCT/FR2021/050636, filed Apr. 9, 2021, 7 pages.

French Search Report mailed Dec. 22, 2020, issued in Application No. FR2003639, filed Apr. 10, 2020, 7 pages.

International Search Report mailed Jul. 28, 2021, issued in corresponding International Application No. PCT/FR2021/050636, filed Apr. 9, 2021, 6 pages.

Written Opinion mailed Jul. 28, 2021, issued in corresponding International Application No. PCT/FR2021/050636, filed Apr. 9, 2021, 6 pages.

* cited by examiner

SYSTEM FOR DETERMINING THE ANGULAR SETTING OF AN ANNULAR ROW OF STATOR VANES

FIELD OF THE DISCLOSURE

The present document relates to the determination of the angular setting of an annular row of stator vanes arranged downstream of a pusher propeller in a propulsion system of an aircraft.

BACKGROUND

Conventionally, an aircraft, as illustrated in FIG. 1, comprises a propulsion system 1 with a longitudinal axis 2 comprising a pusher propeller 4 formed by an annular row of vanes movable about the longitudinal axis 2. An annular row of stator vanes 6 is arranged downstream of the pusher propeller 4 in order to convert gyration induced by the pusher propeller 4 into an axial advance velocity and thereby increase the thrust generated. Upstream and downstream are defined with respect to the direction of gas circulation within the propulsion system.

It is known to achieve an angular setting of the vanes of the pusher propeller 4 in order to optimize propulsion of the aircraft. While the setting of the stator vanes 6 is also known, however, no details are given regarding the method and calculations required to achieve an optimized angular setting of the annular row of stator vanes 6 as a function of the flight phase. The implementation of control laws for the angular setting is complex and there is no optimized, simple and effective system for angularly setting an annular row of stator vanes 6 arranged downstream of a pusher propeller 4 of an aircraft propulsion system, which propeller is also a variable-pitch propeller.

This document aims to address these drawbacks in a simple, reliable and cost-effective way.

SUMMARY

The present document relates to a method for determining the angular setting of an annular row of stator vanes arranged downstream of a pusher propeller of a propulsion system with a longitudinal axis, the annular row of stator vanes receiving an air flow having a velocity $V_2$ including a longitudinal component $V_{iz}$ and a tangential component $V_{i\theta}$ associated with the velocity of gyration generated by the pusher propeller, the method comprising the steps:

a) establishing a theoretical model of the pusher propeller using a power $P_1$ and a mechanical speed $N_1$ associated with the pusher propeller, and flight conditions comprising a velocity of the airflow incident on the pusher propeller, the altitude of the propulsion system and ambient temperature;

b) determining an angular setting of the pusher propeller from the theoretical model;

c) from the theoretical model of the pusher propeller, defining dimensionless parameters including at least a power coefficient $C_{P,1}$, a pull coefficient $C_{T,1}$ and an advance ratio $J_1$ of the pusher propeller defined by the following formulae:

$$C_{P,1} = \frac{P_1}{\rho \cdot N_1^3 \cdot D_1^5}$$

$$C_{T,1} = \frac{T_1}{\rho \cdot N_1^2 \cdot D_1^4}$$

$$J_1 = \frac{V_0}{N_1 \cdot D_1}$$

where $\rho$ corresponds to the density of an ambient air, $V_0$ corresponds to a flight velocity of the propulsion system, $N_1$ corresponds to the mechanical speed of the pusher propeller, $D_1$ corresponds to a diameter of the pusher propeller, $P_1$ corresponds to the power of the pusher propeller, $T_1$ corresponds to a pull of the pusher propeller;

d) calculating the longitudinal component $V_{iz}$ and the tangential component $V_{i\theta}$ of the velocity $V_2$ of the airflow incident on the annular row of stator vanes from the dimensionless parameters and deducing an angle $\varphi_{12}$ between the velocity of the airflow incident on the annular row of stator vanes and a plane of rotation of the pusher propeller;

e) determining an angular setting to be applied to the annular row of stator vanes from the angle, a Mach number associated with the velocity of the airflow incident on the pusher propeller and a database associating with each said angle, different angular settings of the annular row of stator vanes obtained for different Mach numbers.

A database is pre-constructed so as to facilitate real-time angular setting as a function of the position of the pusher propeller. Indeed, from a power and a mechanical speed associated with the pusher propeller, from a velocity of the airflow incident on the pusher propeller, from the altitude of the propulsion system and from ambient temperature, the angular setting of the pusher propeller is obtained and the method makes it possible, subsequently, to determine the optimum angular setting of each of the stator vanes from the database.

The way of determining the angular setting to be applied to the annular row of stator vanes provided herein makes the control of the annular row of stator vanes easier to implement, more robust to changes in flight conditions such as the velocity of the airflow incident on the pusher propeller, the altitude of the propulsion system and ambient temperature. Ambient temperature here refers to the surrounding temperature in which the propulsion system is immersed.

It is possible to obtain an optimum thrust of the propulsion system by virtue of the optimum angular setting of the annular row of stator vanes as a function of the setting of the pusher propeller.

The axial component $V_{iz}$ of the velocity $V_2$ of the airflow incident on the annular row of stator vanes can be calculated from the following formula:

$$V_{iz} = \frac{V_0}{2J_1} \left[ \sqrt{J_1^2 + K_1 \cdot C_{T,1}} - J_1 \right]$$

where $K_1$ is a constant related to the radial dimension of the pusher propeller.

The tangential component $V_{i\theta}$ of the velocity $V_2$ of the airflow incident on the annular row of stator vanes can be calculated from the following formula:

$$V_{i\theta} = K_2 \cdot \frac{V_0 \cdot C_{P,1}}{J_1} \cdot \frac{1}{J_1 + \sqrt{J_1^2 + K_1 \cdot C_{T,1}}}$$

where $K_1$ and $K_2$ are constants related to the radial dimension of the pusher propeller.

The angle $\varphi_{12}$ can obey the following formula:

$$\varphi_{12} = \frac{180}{\pi} \tan^{-1}\left(\frac{V_0 + V_{iz}}{V_{i\theta}}\right).$$

The angular setting $\beta_2$ of the annular row of stator vanes may be communicated by a FADEC system to actuators which control the angular setting $\beta_2$ of the annular row of stator vanes. By the way it works, the present method requires less data and is therefore easier to implement in a calculator such as a FADEC (Full Authority Digital Engine Control).

The database may be a table constructed by simulation or testing in which several operating conditions are calculated from all combinations of parameters such as the rotor speed N1, flight Mach number, angular setting $\beta_1$ of the pusher propeller and angular setting $\beta_2$ of the annular row of stator vanes, giving a table of maximized pull coefficient $C'_{T,2}$ as a function of the flight Mach number, angle $\varphi_{12}$ and angular setting $\beta_2$ of the annular row of stator vanes. The advantage of this database is that it allows very quick access to the information. Indeed, once the database has been created, a simple reading of the optimum value of the angular setting $\beta_2$ of the annular row of stator vanes is necessary. The database as it is constituted is lighter and can therefore be integrated into the FADEC.

DETAILED DESCRIPTION

Figure 1:
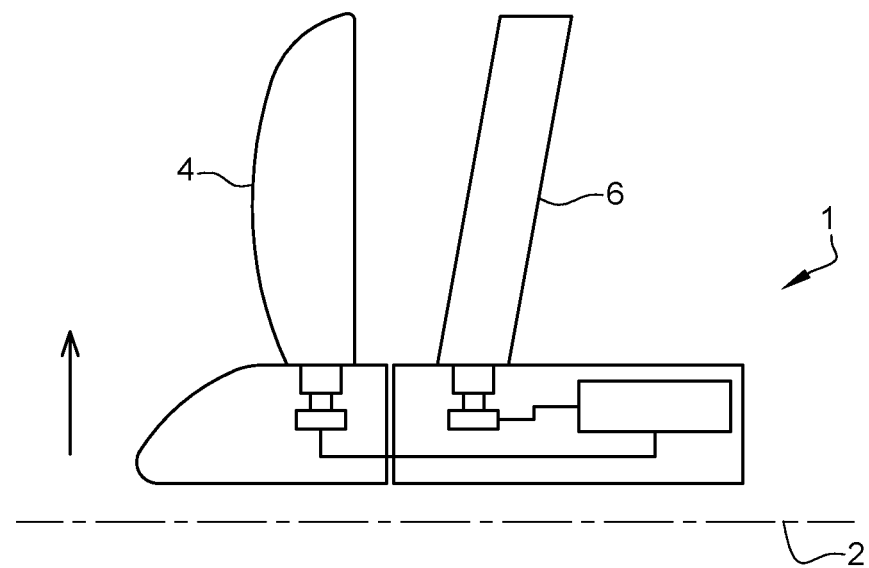
FIG. 1 is a schematic view of a pusher propeller system with an annular row of stator vanes.
Figure 2:
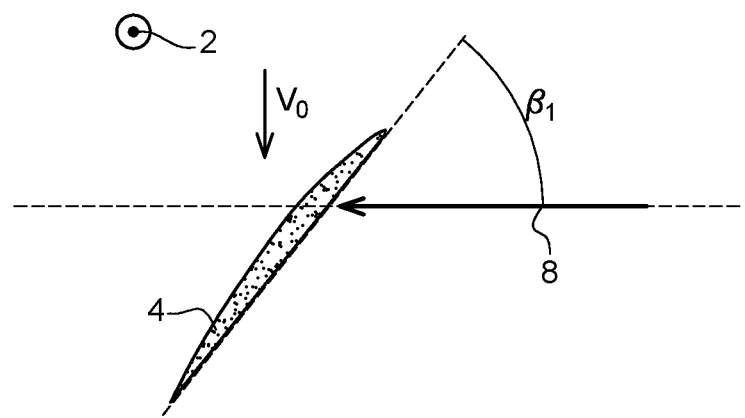
FIG. 2 is a schematic view of the air flow and more precisely of the velocity of this flow received by a pusher propeller.

FIG. 2 illustrates an air flow at the inlet of a rotating propeller 4 of a propulsion system 1 with a longitudinal axis 2 according to FIG. 1. When the pusher propeller 4 has an angular setting $\beta_1$, then it receives air at a flight velocity $V_0$ oriented perpendicular to the longitudinal axis 2.

Figure 3:
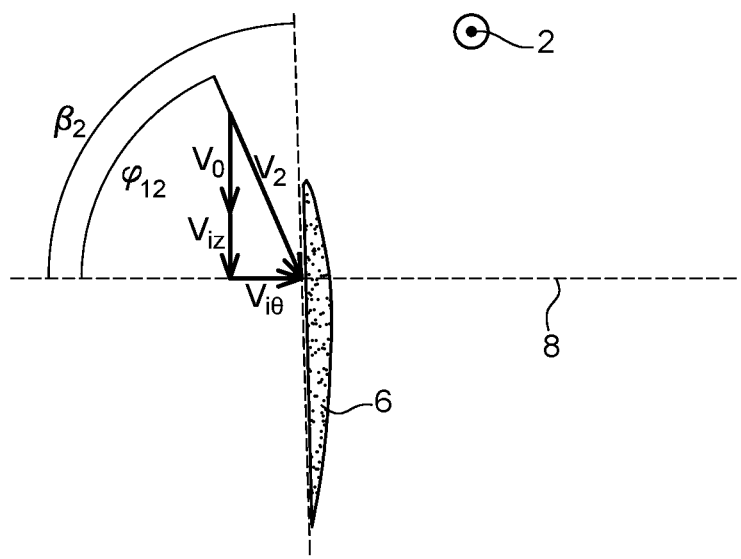
FIG. 3 is a schematic view of the air flow and more specifically of the velocity of this flow received by the annular row of stator vanes downstream of the pusher propeller shown in FIG. 3.
Figure 4:
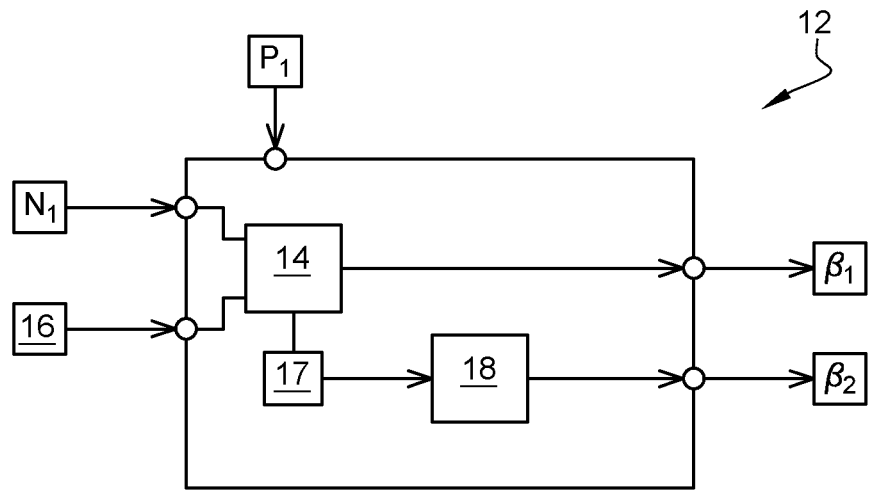
FIG. 4 is a diagram representing the method for determining the angular setting of a pusher propeller and the angular setting of the annular row of stator vanes downstream of the pusher propeller.

In such a configuration, as illustrated in FIG. 3, an annular row of stator vanes 6 located downstream of the pusher propeller 4 then receives an air flow having a velocity $V_2$ having a longitudinal component comprising the flight velocity $V_0$ (longitudinal only) and a longitudinal velocity $V_{iz}$ and a tangential component $V_{i\theta}$ where $V_{iz}$ represents the longitudinal component and $V_{i\theta}$ the tangential component associated with the velocity of gyration generated by the pusher propeller 6.

The angle $\varphi_{12}$ between the velocity of the airflow incident on the annular row of stator vanes 6 and a plane of rotation 8 of the pusher propeller 4 is very important for defining the aerodynamic performance of the annular row of stator vanes 6. In combination with the angular setting $\beta_2$ to be applied to the annular row of stator vanes 6, the angle $\varphi_{12}$ defines the angle of attack. If the angle of attack is too high, a stall of the annular row of stator vanes 6 is observed. This stall results in a high level of pressure loss and significant gyration, which reduces the propulsive efficiency of the pusher propeller 4.

The angle of attack therefore has to remain within an acceptable range defined according to the aerodynamic robustness of the profile used, known at the time of its design. Furthermore, there is an optimum angle of attack for which the performance of the annular row of stator vanes 6 is maximum. In order to optimize performance of the propulsion system 1, it is therefore necessary to be close to this angle of attack during the entire flight phase. The angular setting $\beta_2$ to be applied to the annular row of stator vanes 6 therefore has to be controlled by the angle $\varphi_{12}$.

Thus, the present document provides an efficient way to combine the parameters influencing the aerodynamics of the pusher propeller 4 and the annular row of stator vanes 6 in order to determine the angular setting $\beta_2$ of the annular row of stator vanes 6 as a function of only two parameters, namely the angle $\varphi_{12}$ and a Mach number 10 associated with the velocity of the airflow incident on the pusher propeller 4.

FIG. 3 illustrates a diagram representing the method for determining the angular setting $\beta_1$ of a pusher propeller 4 and the angular setting $\beta_2$ of the annular row of stator vanes 6 downstream of the pusher propeller 4. This method 12 can be implemented in a calculator of the propulsion system (FADEC—"Full Authority Digital Engine Control").

The method 12 comprises a first step of establishing a theoretical model 14 of the pusher propeller 4. For this, a power $P_1$ and a mechanical speed $N_1$ associated with the pusher propeller, and flight conditions 16 comprising a velocity $V_0$ of the airflow incident on the pusher propeller, the altitude of the propulsion system and ambient temperature are used as an input to the theoretical model of the pusher propeller. This theoretical model 14 of the pusher propeller 4 makes it possible to determine an angular setting $\beta_1$ of the pusher propeller 4. The pusher propeller is thus modelled by means of the theoretical model, which is in the form of a table comprising a set of dimensionless coefficients, comprising an advance ratio $J_1$, a power coefficient $C_{p,1}$ and a pull coefficient $C_{T,1}$ defined for a plurality of angular settings $\beta_1$ of the pusher propeller 4, for a plurality of velocities $V_0$ of incident airflow. As an output of the theoretical model 14 of the pusher propeller, the dimensionless parameters 17 including at least the power coefficient $C_{p,1}$, the pull coefficient $C_{T,1}$ and the advance ratio $J_1$ of the pusher propeller 4 may be used and will be defined by the following formulae:

$$C_{P,1} = \frac{P_1}{\rho \cdot N_1^3 \cdot D_1^5}$$

$$C_{T,1} = \frac{T_1}{\rho \cdot N_1^2 \cdot D_1^4}$$

-continued $$J_1 = \frac{V_0}{N_1 \cdot D_1}$$

where ρ corresponds to the density of an ambient air, $V_0$ corresponds to a flight velocity of the propulsion system, $N_1$ corresponds to the mechanical speed of the pusher propeller, $D_1$ corresponds to a diameter of the pusher propeller, $P_1$ corresponds to the power of the pusher propeller, $T_1$ corresponds to a pull of the pusher propeller.

Figure 5:
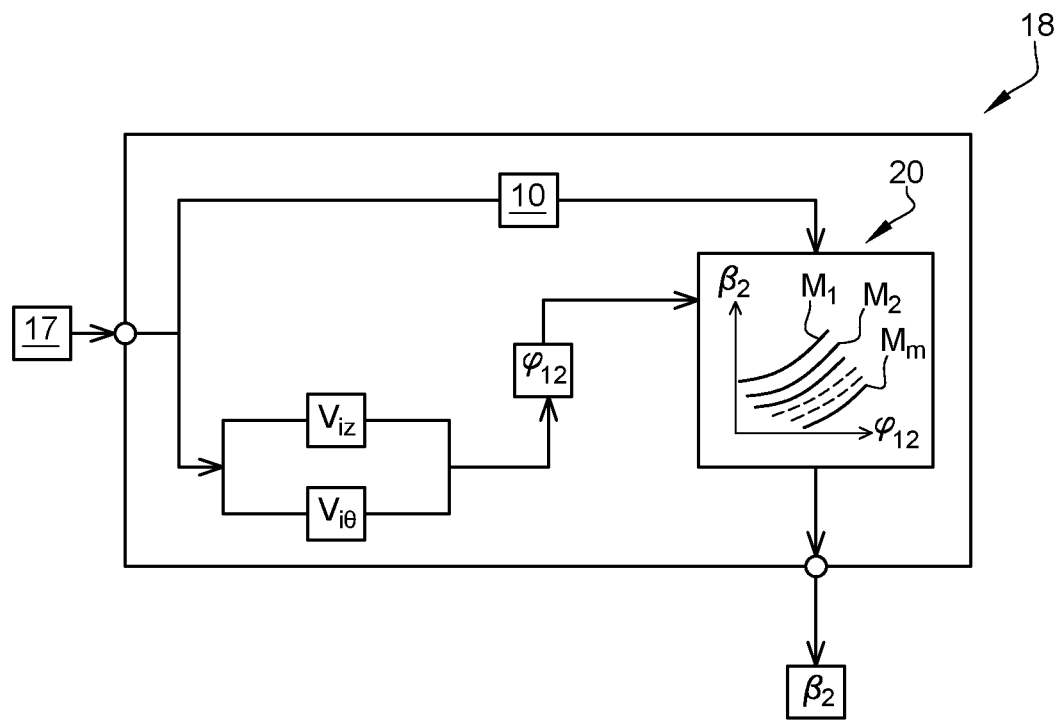
FIG. 5 is a schematic diagram of the operation of the setting model of the annular row of stator vanes.

These dimensionless parameters 17 associated with the pusher propeller 4 are then communicated to a setting model of the annular row of stator vanes 18, as shown in FIG. 5. Indeed, from the dimensionless parameters 17, the longitudinal velocity $V_{iz}$ and the tangential component $V_{i\theta}$ are calculated on the basis of Froude's law of conservation of momentum for the longitudinal velocity $V_{iz}$ and Euler's law for the tangential component $V_{i\theta}$ These two velocities $V_{iz}$ and $V_{i\theta}$ respect the following relationship:

$$V_{iz} = \frac{V_0}{2J_1}\left[\sqrt{J_1^2 + K_1 \cdot C_{T,1}} - J_1\right]$$

where $K_1$ is a constant related to the radial dimension of the pusher propeller 4 and:

$$V_{i\theta} = K_2 \cdot \frac{V_0 \cdot C_{P,1}}{J_1} \cdot \frac{1}{J_1 + \sqrt{J_1^2 + K_1 \cdot C_{T,1}}}$$

where $K_1$ and $K_2$ are constants related to the radial dimension of the pusher propeller 4. The angle $\varphi_{12}$ is then obtained from the longitudinal velocity $V_{iz}$ and tangential component $V_{i\theta}$ according to the following relationship:

$$\varphi_{12} = \frac{180}{\pi} \tan^{-1}\left(\frac{V_0 + V_{iz}}{V_{i\theta}}\right).$$

A database 20 is constructed beforehand. It allows each said angle $\varphi_{12}$ to be associated with different angular settings $\beta_2$ of the annular row of stator vanes 6 obtained for different Mach numbers.

To implement the database 20, a pull coefficient $C'_{T,2}$ of the straightener is calculated from the following formula:

$$C'_{T,2} = \frac{T_2}{\rho \cdot V_2^2 \cdot D_2^2}$$

where $D_2$ corresponds to a diameter of the annular row of stator vanes 6, $T_2$ corresponds to a pull of the annular row of stator vanes 6, and $V_2$ corresponds to the velocity received by the annular row of stator vanes 6. This pull coefficient is necessary to create the database.

The database is a table which associates with each Mach number and angle $\varphi_{12}$ a value of angular setting $\beta_2$ of the annular row of stator vanes 6. This database is constructed by simulation or by testing. Several operating conditions associated with all combinations of parameters are calculated. The parameters considered are: the rotor speed N1, flight Mach number, angular setting $\beta_1$ of the pusher propeller 4 and angular setting $\beta_2$ of the annular row of stator vanes 6. For each of these operating points, the angle $\varphi_{12}$ and pull coefficient $C'_{T,2}$ are calculated. This gives a table of pull coefficient $C'_{T,2}$ as a function of the flight Mach number, angle $\varphi_{12}$ and angular setting $\beta_2$ of the annular row of stator vanes 6. For each flight Mach number and angle $\varphi_{12}$ in this table, the value of angular setting $\beta_2$ of the annular row of stator vanes 6 which maximizes the coefficient $C'_{T,2}$ is chosen. Thus, the control law in the form of the angular setting $\beta_2$ of the annular row of stator vanes 6 as a function of Mach number and angle $\varphi_{12}$ is obtained.

The creation of a database as described above makes it possible to quickly and simply perform the determination of the optimum value of the angular setting $\beta_2$ to be applied to the annular row of stator vanes. This database can be integrated into a memory unit of the FADEC which does not require the addition of complex calculation means.

From this database 20, the angle $\varphi_{12}$ and a Mach number 10 associated with the velocity of the airflow incident on the pusher propeller, an angular setting $\beta_2$ to be applied to the annular row of stator vanes 6 is determined.

Finally, the angular setting $\beta_2$ of the annular row of stator vanes 6 is communicated by a FADEC system to actuators which control the setting of the annular row of stator vanes 6.

The system and logic provided herein make the determination of the angular setting $\beta_2$ of the annular row of stator vanes row easier to implement, more robust to changes in flight conditions 16 and easier to store in a FADEC, as the method 12 requires less data. As a result of this determination of the angular setting $\beta_2$, the annular row of stator vanes 6 always provides the optimum amount of thrust for the given flight phase.

The invention claimed is:

1. A method for determining an angular setting ($\beta_2$) of an annular row of stator vanes arranged downstream of a pusher propeller of a propulsion system with a longitudinal axis, said annular row of stator vanes receiving an airflow having a velocity ($V_2$) including a longitudinal component ($V_{iz}$) and a tangential component ($V_{i\theta}$) associated with a velocity of gyration generated by the pusher propeller, the method comprising the steps of:
   a) establishing a theoretical model of the pusher propeller using a power ($P_1$) and a mechanical speed ($N_1$) associated with said pusher propeller, and flight conditions comprising a velocity of the airflow incident on the pusher propeller, an altitude of said propulsion system and ambient temperature;
   b) determining an angular setting ($\beta_1$) of said pusher propeller from said theoretical model;
   c) from said theoretical model of the pusher propeller, defining dimensionless parameters including at least a power coefficient ($C_{P,1}$), a pull coefficient ($C_{T,1}$) and an advance ration ($J_1$) of said pusher propeller defined by the following formulae:

$$C_{P,1} = \frac{P_1}{\rho \cdot N_1^3 \cdot D_1^5}$$

$$C_{T,1} = \frac{T_1}{\rho \cdot N_1^2 \cdot D_1^4}$$

$$J_1 = \frac{V_0}{N_1 \cdot D_1}$$

wherein:
ρ corresponds to the density of an ambient air,
$V_0$ corresponds to a flight velocity of said propulsion system,
$N_1$ corresponds to said mechanical speed of said pusher propeller,
$D_1$ corresponds to a diameter of said pusher propeller,
$P_1$ corresponds to said power of said pusher propeller, and
$T_1$ corresponds to a pull of said pusher propeller;

d) calculating the longitudinal component ($V_{iz}$) and the tangential component ($V_{i\theta}$) of said velocity ($V_2$) of the airflow incident on said annular row of stator vanes from said dimensionless parameters and deducing an angle ($\varphi_{12}$) between said velocity of the airflow incident on said annular row of stator vanes and a plane of rotation of said pusher propeller; and e) determining an angular setting ($\beta_2$) to be applied to said annular row of stator vanes from said angle ($\varphi_{12}$), a Mach number associated with the velocity of the airflow incident on the pusher propeller and a database associating with each said angle ($\varphi_{12}$), different angular settings ($\beta_2$) of said annular row of stator vanes obtained for different Mach numbers, wherein said angular setting ($\beta_2$) of said annular row of stator vanes is implemented by a FADEC system and communicated by the FADEC system to actuators which control the angular setting ($\beta_2$) of said annular row of stator vanes, the method further comprising the step of controlling the angular setting ($\beta_2$) of said annular row of stator vanes by the FADEC system.

2. The method according to claim 1, wherein said longitudinal component ($V_{iz}$) of said velocity ($V_2$) of the airflow incident on the annular row of stator vanes is calculated from the following formula:

$$V_{iz} = \frac{V_0}{2J_1}\left[\sqrt{J_1^2 + K_1 \cdot C_{T,1}} - J_1\right]$$

wherein $K_1$ is a constant related to a radial dimension of the pusher propeller.

3. The method according to claim 1, wherein said tangential component ($V_{i\theta}$) of said velocity ($V_2$) of the airflow incident on the annular row of stator vanes is calculated from the following formula:

$$V_{i\theta} = K_2 \cdot \frac{V_0 \cdot C_{P,1}}{J_1} \cdot \frac{1}{J_1 + \sqrt{J_1^2 + K_1 \cdot C_{T,1}}}$$

wherein $K_1$ and $K_2$ are constants related to a radial dimension of the pusher propeller.

4. The method according to claim 1, wherein said angle ($\varphi_{12}$) obeys the following formula:

$$\varphi_{12} = \frac{180}{\pi} \tan^{-1}\left(\frac{V_0 + V_{iz}}{V_{i\theta}}\right).$$

5. The method according to claim 1, wherein the database is a table constructed by simulation or testing in which several operating conditions are calculated from all combinations of parameters such as the rotor speed N1, flight Mach number, angular setting $\beta_1$ of the pusher propeller and angular setting $\beta_2$ of said annular row of stator vanes, giving a table of maximised pull coefficient $C'_{T,2}$ as a function of the flight Mach number, angle $\varphi_{12}$ and angular setting $\beta_2$ of said annular row of stator vanes.

* * * * *